United States Patent
Park et al.

(10) Patent No.: US 9,712,278 B2
(45) Date of Patent: *Jul. 18, 2017

(54) ADJUSTING BLIND DECODING OF DOWNLINK CONTROL CHANNEL

(71) Applicant: KT CORPORATION, Gyeonggi-do (KR)

(72) Inventors: Kyu Jin Park, Seoul (KR); Seung Hyun Kang, Seoul (KR); Woo-Jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,696

(22) Filed: Jul. 5, 2016

(65) Prior Publication Data

US 2016/0315732 A1    Oct. 27, 2016

Related U.S. Application Data

(63) Continuation of application No. 14/038,863, filed on Sep. 27, 2013, now Pat. No. 9,414,263.

(30) Foreign Application Priority Data

Sep. 28, 2012  (KR) .......... 10-2012-0109011
Sep. 2, 2013   (KR) .......... 10-2013-0104930

(51) Int. Cl.
*H04L 12/26* (2006.01)
*H04L 1/00* (2006.01)
(Continued)

(52) U.S. Cl.
CPC .......... *H04L 1/0038* (2013.01); *H04W 28/06* (2013.01); *H04W 72/042* (2013.01); *H04W 88/02* (2013.01); *H04W 88/08* (2013.01)

(58) Field of Classification Search
CPC .... H04L 5/0053; H04W 72/042; H04W 28/06
See application file for complete search history.

(56) References Cited

U.S. PATENT DOCUMENTS 9,401,792 B2 *  7/2016  Lee .................... H04L 5/0053
2009/0168922 A1  7/2009  Malladi et al.
(Continued)

FOREIGN PATENT DOCUMENTS

CN    101843022 A    9/2010

OTHER PUBLICATIONS

Nokia et al., "Considerations on search spaces", R1-123653, 3GPP TSG RAN WG1 Meeting #70, Qingdao, China, Aug. 13-17, 2012, pp. 1-7.

(Continued)

*Primary Examiner* — Shaq Taha
(74) *Attorney, Agent, or Firm* — IP Legal Services, LLC

(57) ABSTRACT

The present disclosure is related to adjusting a blind decoding of a downlink control channel in a base station. A method of adjusting a blind decoding of a downlink control channel may include creating an enhanced physical downlink control channel (EPDCCH) using the number of EPDCCH candidates per aggregation level (AL) in each of one or more EPDCCH sets for user equipment; and transmitting the created EPDCCH to the user equipment. Herein, the number of EPDCCH candidates is determined based on at least one of (i) a resource size associated with configuration of each EPDCCH set and (ii) the total number of EPDCCH sets.

9 Claims, 6 Drawing Sheets

(51) Int. Cl.
*H04W 28/06* (2009.01)
*H04W 72/04* (2009.01)
*H04W 88/02* (2009.01)
*H04W 88/08* (2009.01)

(56) References Cited

U.S. PATENT DOCUMENTS

| | | |
|---|---|---|
| 2011/0103509 A1 | 5/2011 | Chen et al. |
| 2012/0263134 A1 | 10/2012 | Malladi et al. |
| 2012/0320848 A1* | 12/2012 | Chen ............... H04W 28/06 370/329 |
| 2013/0114529 A1 | 5/2013 | Chen et al. |
| 2013/0183987 A1 | 7/2013 | Vrzic et al. |
| 2013/0195020 A1 | 8/2013 | Frederiksen et al. |
| 2013/0242904 A1 | 9/2013 | Sartori et al. |
| 2014/0036747 A1* | 2/2014 | Nory ................. H04W 72/0406 370/311 |
| 2014/0092821 A1 | 4/2014 | Zhu et al. |
| 2014/0140306 A1 | 5/2014 | Malladi et al. |
| 2014/0328302 A1 | 11/2014 | Park et al. |

OTHER PUBLICATIONS

Alcatel-Lucent et al., "ePDCCH search space design and aggregation levels", R1-123150, 3GPP TSG RAN WG1 Meeting #70, Qingdao, China, Aug. 13-17, 2012, pp. 1-4.

Fujitsu, "UE-specific Search Space Design Principles for ePDCCH", R1-123304, 3GPP TSG RAN WG1 Meeting#70, Qingdao, China, Aug. 13-17, 2012, pp. 1-6.

* cited by examiner

FIG. 3

310 — Two Localized EPDCCH sets (K=2)

| | AL=1 | AL=2 | AL=4 | AL=8 |
|---|---|---|---|---|
| First Localized EPDCCH set | 3 | 3 | 1 | 1 |
| Second Localized EPDCCH set | 3 | 3 | 1 | 1 |

312 — Two Localized EPDCCH sets (K=2)

| | AL=1 | AL=2 | AL=4 | AL=8 |
|---|---|---|---|---|
| First Localized EPDCCH set | 4 | 4 | 1 | 1 |
| Second Localized EPDCCH set | 2 | 2 | 1 | 1 |

320 — Two Distributed EPDCCH sets (K=2)

| | AL=1 | AL=2 | AL=4 | AL=8 | AL=16 |
|---|---|---|---|---|---|
| First Distributed EPDCCH set | 3 | 3 | 1 | 1 | 0 |
| Second Distributed EPDCCH set | 3 | 3 | 1 | 0 | 1 |

322 — Two Distributed EPDCCH sets (K=2)

| | AL=1 | AL=2 | AL=4 | AL=8 | AL=16 |
|---|---|---|---|---|---|
| First Distributed EPDCCH set | 4 | 4 | 1 | 1 | 0 |
| Second Distributed EPDCCH set | 2 | 2 | 1 | 0 | 1 |

330 — One Localized EPDCCH set and one Distributed EPDCCH set (K=2)

| | AL=1 | AL=2 | AL=4 | AL=8 | AL=16 |
|---|---|---|---|---|---|
| First EPDCCH set (Localized set) | 3 | 3 | 1 | 1 | 0 |
| Second EPDCCH set (Distributed set) | 3 | 3 | 1 | 0 | 1 |

332 — One Localized EPDCCH set and one Distributed EPDCCH set (K=2)

| | AL=1 | AL=2 | AL=4 | AL=8 | AL=16 |
|---|---|---|---|---|---|
| First EPDCCH set (Localized set) | 4 | 4 | 1 | 1 | 0 |
| Second EPDCCH set (Distributed set) | 2 | 2 | 1 | 0 | 1 |

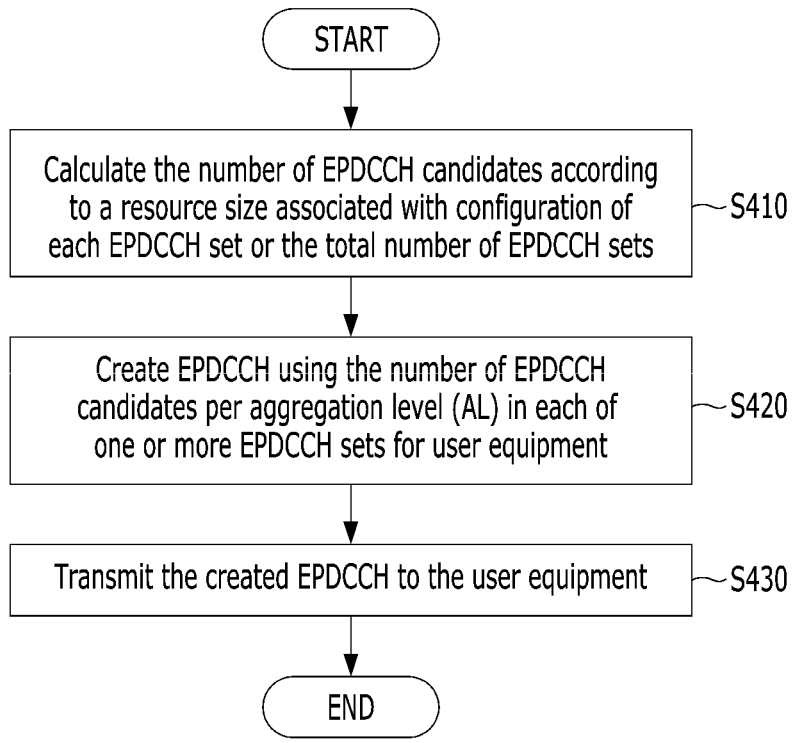

ADJUSTING BLIND DECODING OF DOWNLINK CONTROL CHANNEL

CROSS REFERENCE TO PRIOR APPLICATIONS

The present application is continuation application of U.S. patent application Ser. No. 14/038,863 (filed on Sep. 27, 2013), which claims priority under 35 U.S.C. §119 to Korean Patent Application Nos. 10-2012-0109011 (filed on Sep. 28, 2012) and 10-2013-0104930 (filed on Sep. 2, 2013).

TECHNICAL FIELD

The present disclosure relates to adjusting a blind decoding of a downlink control channel. Particularly, the present disclosure relates to a method and an apparatus for adjusting a blind decoding of user equipment, in the case that the user equipment is configured to receive downlink control information (DCI) through an enhanced physical downlink control channel (EPDCCH).

BACKGROUND ART

As communication systems make progress, consumers such as business entities and individuals have used a large variety of wireless terminals (or devices). Mobile communication systems such as a long term evolution (LTE) or a LTE-Advanced (LTE-A) system associated with current 3GPP standards may be a high-speed and large-capacity communication system which is out of voice-centered service and can transmit/receive a variety of data including image, wireless data, and the like. Particularly, in the mobile communication system, a technology capable of a large-capacity data transmission equivalent to data transmission in a wired telecommunication network is desired.

Meanwhile, as information to be carried through a downlink control channel increases, a new EPDCCH has been introduced. However, the number of blind decodings in an EPDCCH search space may not be controlled. Accordingly, in this case, there may be a problem that a blind decoding time increases.

DISCLOSURE OF INVENTION

Technical Problem

In order to overcome such problem, in the case that user equipment is configured to receive downlink control information (DCI) through an EPDCCH corresponding to a downlink control channel, the present embodiment may provide a method and an apparatus for adjusting a blind decoding of the user equipment. More specifically, the present embodiment may provide a method and an apparatus for determining the number of blind decoding candidates in one or more EPDCCH sets (i.e., EPDCCH monitoring sets), based on the number of EPDCCH sets and a resource size associated with configuration of each EPDCCH set. Furthermore, the present embodiment may provide a method and an apparatus for adjusting a blind decoding procedure of user equipment using the determined number of blind decoding candidates.

Technical Solution

In accordance with at least one embodiment, a method may be provided for adjusting transmission of a downlink control channel in a base station. The method may include creating an enhanced physical downlink control channel (EPDCCH) using the number of EPDCCH candidates per aggregation level (AL) in each of one or more EPDCCH sets for user equipment; and transmitting the created EPDCCH to the user equipment. Herein, the number of EPDCCH candidates may be determined based on at least one of (i) a resource size associated with configuration of each EPDCCH set and (ii) the total number of EPDCCH sets.

In accordance with another embodiment, a method may be provided for adjusting a blind decoding of a downlink control channel in user equipment. The method may include receiving a downlink signal from a base station; and performing a blind decoding procedure in an EPDCCH region of the received downlink signal, by applying the number of EPDCCH candidates per aggregation level (AL) in each of one or more EPDCCH sets. Herein, the number of EPDCCH candidates may be determined based on at least one of (i) a resource size associated with configuration of each EPDCCH set and (ii) the total number of EPDCCH sets.

In accordance with still another embodiment, a base station may be provided for adjusting transmission of a downlink control channel. The base station may include a control processor and a transmitter. The control processor may be configured to create an enhanced physical downlink control channel (EPDCCH) using the number of EPDCCH candidates per aggregation level (AL) in each of one or more EPDCCH sets for user equipment. The transmitter may be configured to transmit the created EPDCCH to the user equipment. Herein, the number of EPDCCH candidates may be determined based on at least one of (i) a resource size associated with configuration of each EPDCCH set and (ii) the total number of EPDCCH sets.

In accordance with still another embodiment, user equipment may be provided for adjusting a blind decoding of a downlink control channel. The user equipment may include a receiver and a control processor. The receiver may be configured to receive a downlink signal from a base station. The control processor may be configured to perform a blind decoding in an EPDCCH region of the received downlink signal, by applying the number of EPDCCH candidates per aggregation level (AL) in each of one or more EPDCCH sets. Herein, the number of EPDCCH candidates is determined based on at least one of (i) a resource size associated with configuration of each EPDCCH set and (ii) the total number of EPDCCH sets.

Advantageous Effects

In the case that user equipment is configured to receive an EPDCCH corresponding to a downlink control channel, the present embodiment may enable the user equipment to perform a blind decoding procedure within 'the number of times determined based on an EPDCCH set characteristic' (e.g., the number of times determined in proportion to a size of an EPDCCH set), and thereby improving a blind decoding performance of the user equipment in an EPDCCH search space. Herein, the size of an EPDCCH set corresponds to a characteristic of the EPDCCH set of the user equipment.

BRIEF DESCRIPTION OF THE DRAWINGS

FIG. 3 illustrates the number of EPDCCH candidates in a case of combining Embodiment 2 and Formula 3 in accordance with at least one embodiment.

FIG. 4 illustrates a procedure of creating an EPDCCH based on determination of the number of blind decodings and transmitting the created EPDCCH, in a base station in accordance with at least one embodiment.

MODE FOR CARRYING OUT THE INVENTION

Figure 1:
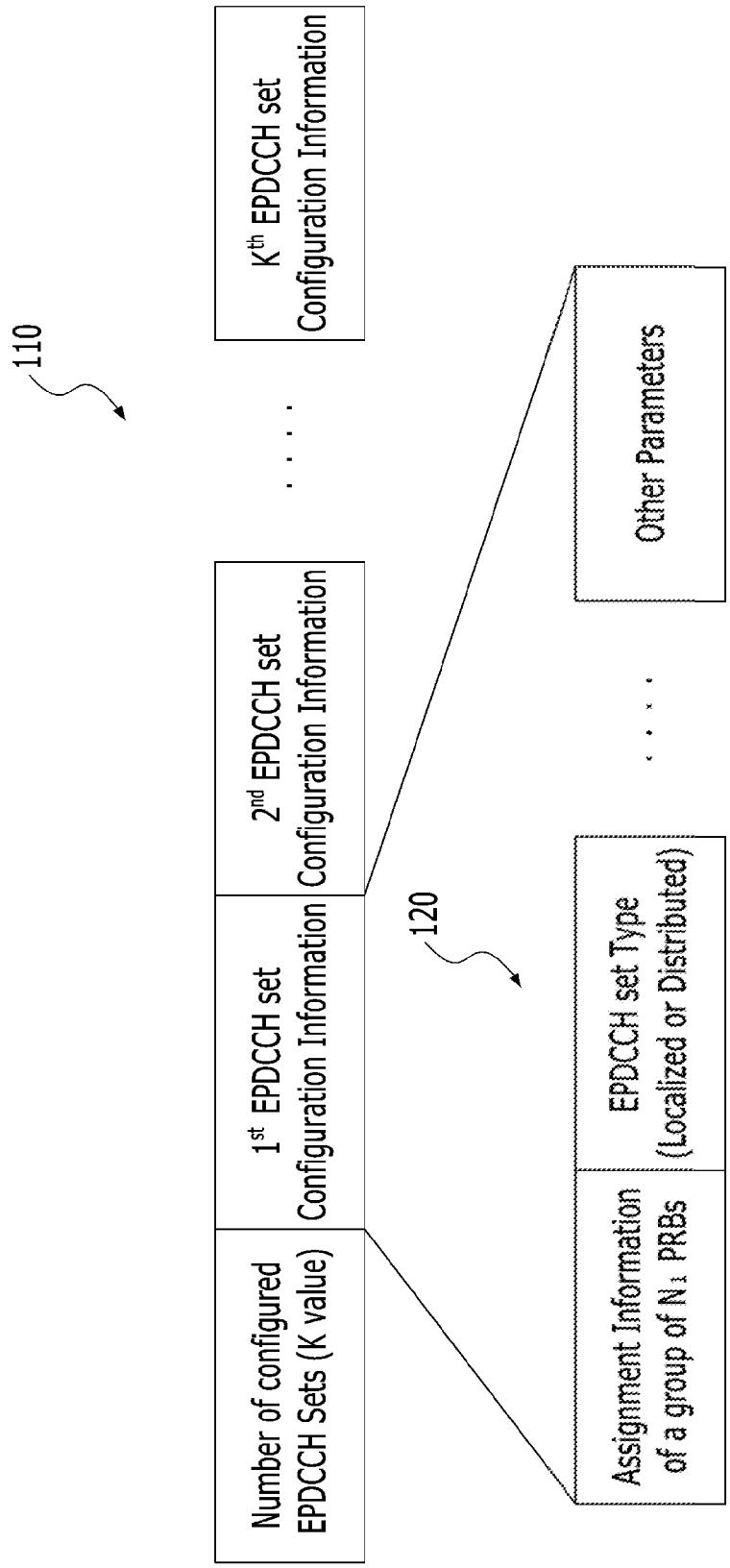
FIG. 1 illustrates a structure for configuration of EPDCCH sets for a certain user equipment in accordance with at least one embodiment.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

A wireless communication system in accordance with at least one embodiment may be widely used in order to provide a variety of communication services such as a voice service, a packet data service, and so forth. The wireless communication system may include user equipment (UE) and a base station (BS or eNB). In the present description, the term "user equipment" or "UE" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

A base station or a cell may indicate a station that communicates with the user equipment. Such a base station may be referred to as different terms, for example, a Node-B, an evolved Node-B (eNB), a sector, a site, a base transceiver system (BTS), an access point (AP), a relay node (RN), a remote radio head (RRH), a radio unit (RU), and the like.

That is, in the present description, the base station (BS) or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In a case of the above-listed various cells, there is a base station controlling each cell. Accordingly, the term "base station" may be construed as two meanings. The term "base station" may indicate (i) an apparatus itself providing a megacell, a macrocell, a microcell, a picocell, a femtocell, or a small cell in connection with a wireless region, or (ii) the wireless region itself. In the case (i), apparatuses providing a predetermined wireless region may be controlled by the same entity. Furthermore, all apparatuses which interact to configure the wireless region through cooperation may be indicated to as "the base station." According to a configuration scheme of a wireless region, one or more of eNB, RRH, an antenna, RU, a low power node (LPN), a point, a transmission/reception point, a transmission point, a reception point, or the like may be embodiments of the base station. In the case (ii), considering from the perspective of user equipment (UE) or the position of neighboring base stations, the wireless region itself receiving and/or transmitting signals may be referred to as a base station.

Accordingly, a megacell, a macrocell, a microcell, a picocell, a femtocell, a small cell, RRH, an antenna, RU, LPN, a point, eNB, a transmission/reception point, a transmission point, and a reception point may be inclusively referred to as "a base station."

In the present description, the user equipment and the base station may be two types of transmission/reception subjects, having an inclusive meaning, which are used to embody the technology and the technical concept disclosed herein, and may not be limited to a specific term or word. Furthermore, the user equipment and the base station may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to the base station. Alternatively, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be constituted based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like.

Meanwhile, control information may be transmitted through 'enhanced PDCCH' or 'extended PDCCH' (EPDCCH). In the present description, the term "cell" may indicate one of coverage of a signal transmitted from a transmission point or transmission/reception point, a component carrier having the coverage, and the transmission/reception point.

A wireless communication system to which at least one embodiment can be applied may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. The wireless communication system such as a CoMP system may include a plurality of multiple transmission/reception points and at least one user equipment (UE).

Multiple transmission/reception points may include eNB and at least one RRH. Herein, the eNB may be a base station or a macrocell. The RRH may be wiredly controlled by coupling to the eNB through an optical cable or an optical fiber. Furthermore, the RRH may have either a high transmission power, or a low transmission power within a macrocell region.

Hereinafter, a downlink (DL) may represent communication or a communication path from multiple transmission/reception points (e.g., a base station) to user equipment. An uplink (UL) may represent communication or a communication path from the user equipment to the multiple transmission/reception points (e.g., a base station). In the downlink, a transmitter may be a portion of the multiple transmission/reception points, and a receiver may be a portion of the user equipment. In the uplink, a transmitter may be a portion of the user equipment, and a receiver may be a portion of the multiple transmission/reception points.

Hereinafter, a situation in which a signal is transmitted or received through such channels as PUCCH, PUSCH, PDCCH, EPDCCH, and/or PDSCH may be referred to by the expression "transmit or receive PUCCH, PUSCH, PDCCH, EPDCCH, and/or PDSCH."

eNB may perform a downlink transmission to at least one user equipment. eNB may transmit PDSCH corresponding to a primary physical channel, for unicast transmission. Furthermore, eNB may transmit PDCCH or EPDCCH in order to transmit downlink control information, such as scheduling information required for receiving PDSCH, and to transmit scheduling grant information for an uplink data channel (e.g., PUSCH) transmission. Hereinafter, "transmit or receive a signal through a channel" may be referred to as the expression of "transmit or receive a channel."

In this case, as described with reference to figures later, a first user equipment (UE1) may transmit an uplink signal to eNB, and a second user equipment (UE2) may transmit an uplink signal to RRH.

In a typical (or existing) 3GPP LTE/LTE-A rel-8/9/10 system, DCI for a certain user equipment such as DL/UL scheduling grant, TPC commands, and so forth may be transmitted through a specific PDCCH (or EPDCCH). Herein, the specific PDCCH may be transmitted through 'the first one, two, or three OFDM symbols' (in the case that system bandwidth >10 PRBs) or 'the first two, three, or four OFDM symbols' (in the case that system bandwidth ≤10 PRBs) in a downlink subframe. Accordingly, in order to receive 'DCI for a corresponding user equipment' transmitted from a base station (e.g., eNB, RU, RRH, or the like), a certain LTE/LTE-A user equipment may perform a search for whether a PDCCH is transmitted for the corresponding user equipment, in a PDCCH region which is determined through 'the first one, two, or three OFDM symbols' or 'the first two, three, or four OFDM symbols' in the downlink (DL) subframe described above. Such operation of user equipment may be referred to as "a blind decoding." For a blind decoding of the user equipment, a corresponding PDCCH region may be configured with control channel elements (CCEs). Herein, the CCE is a basic unit of PDCCH transmission. In order to form the CCEs, in an PDCCH region of a certain DL subframe, the remaining resource elements (REs) excluding REs used for PHICH/PCFICH and a transmission of a cell-specific reference signal (CRS) may be divided into resource element groups (REGs) which are configured by grouping four consecutive resource elements (REs) in the frequency axis. Herein, the PHICH and PCFICH correspond to different downlink physical channels which are transmitted through a corresponding PDCCH region. The CRS corresponds to a downlink physical signal. As described above, in the case that REGs corresponding to a unit of resource mapping of CCEs are configured, each CCE may be configured with nine interleaved REGs in order to maximize diversity gain of a PDCCH transmission.

User equipment may perform a blind decoding for whether a PDCCH for the user equipment is transmitted, in a unit of the CCE. However, to provide a sufficient processing time for a PDSCH reception of user equipment and to accomplish a power saving in user equipment, a blind decoding may be required to be performed for not 'all CCEs' but 'selected CCEs' of a corresponding PDCCH region. In other words, CCEs to be monitored by user equipment for a blind decoding may be selected per user equipment. An aggregation of CCEs to be monitored by a given user equipment, i.e., PDCCH candidates formed by CCEs on which a PDCCH for the given user equipment could be transmitted may be referred to as 'a search space.' A typical (or current) 3GPP LTE/LTE-A system has defined two types of search spaces to be monitored by a given user equipment. That is, there are a common search space (CSS) and a UE-specific search space (USS). The common search space (CSS) may be monitored by all user equipment in a cell. Such information as PDSCH assignment information for a system information transmission and a random-access response (RAR) transmission, TPC command information, and DL/UL scheduling information for a given user equipment may be transmitted through the common search space (CSS). Meanwhile, the UE-specific search space (USS) may be a unique search space which is determined for each user equipment. For example, DL/UL scheduling information for a corresponding user equipment may be transmitted through the UE-specific search space (USS).

In addition, in the case that a PDCCH for a given user equipment is transmitted, an LTE/LTE-A system may support a PDCCH transmission based on aggregated CCEs. Herein, the PDCCH transmission based on aggregated CCEs may transmit a PDCCH through a plurality of aggregated CCEs ("not one CCE") according to a channel state associated with user equipment, a size of DCI to be transmitted to the user equipment, and so forth. A typical (or current) LTE/LTE-A system may support CCE aggregations. More specifically, the typical (or current) LTE/LTE-A system may support a PDCCH transmission based on aggregation level (AL) 1, 2, 4, or 8. In case of aggregation level (AL) 1, a PDCCH may be transmitted through one CCE. In case of aggregation levels (ALs) 2, 4, and 8, a PDCCH may be transmitted by binding 2, 4, and 8 CCEs, respectively. Herein, a UE-specific search space (USS) for a given user equipment may be independently determined per aggregation level (AL). Furthermore, the number of PDCCH candidates to be monitored by user equipment, i.e., the number of blind decodings to be performed by user equipment may differ per aggregation level (AL).

Hereinafter, DCI formats to be blindly decoded per user equipment will be described in more detail. DCI formats defined in a typical (or current) LTE/LTE-A standard specification may be classified into DCI format 0/4 (i.e., DCI format 0 and/or DCI format 4), DCI format 1 series, DCI format 2 series, and DCI format 3 according to purposes and attributes of information transmitted through a corresponding DCI format. Herein, The DCI format 0/4 may be used for a transmission of UL scheduling information. The DCI format 1 series and DCI format 2 series may be used for a transmission of DL scheduling grants. The DCI format 3 may be used for TPC commands. A given user equipment may perform blind decodings as many as the number of PDCCH candidates per aggregation level (AL) defined above, in a UE-specific search space (USS) for the given user equipment. Especially, the given user equipment may perform blind decodings only for one or two transmission mode (TM) dependent DCI formats (e.g., downlink DCI format 1/1B/1D/2/2A/2B/2C, and/or uplink DCI format 4) and fallback DCI format 0/1A among the above-described DCI formats. Herein, with respect to the 'two' TM dependent DCI formats, one may be a PDSCH TM dependent DCI format, and the other may be 'PUSCH TM dependent DCI format 4' in PUSCH TM 2. A PDSCH transmission mode (TM) may be configured through high-layer signaling, according to (i) capabilities (e.g., the number of Tx/Rx antennas in each of UE and eNB) of a corresponding user equipment and/or a base station to which the user equipment belongs, and (ii) channel states between the corresponding user equipment and the base station. In addition, as defined in a typical (or current) LTE/LTE-A standard, the number of PDCCH candidates per aggregation level (AL) may be 6, 6, 2, or 2 for each aggregation level (AL) 1, 2, 4, or 8. Accordingly, in a corresponding UE-specific search space (USS) for a given user equipment, a blind decoding may be performed 16 times for each of a PDSCH TM dependent DCI format and a fallback DCI format, and therefore be performed up to a total of 32 times. Alternatively, in the case that user equipment is configured as PUSCH transmission mode (TM) 2, a blind decoding may be further performed 16 times for DCI format 4. Accordingly, in this case, the blind decoding may be performed up to a total of 48 times.

In the case that user equipment is configured to receive DCI through EPDCCH, a blind decoding may be defined to be performed in an EPDCCH USS (i.e., a UE-specific search space of the EPDCCH) in place of a legacy PDCCH USS (i.e., a UE-specific search space of a legacy PDCCH), in a downlink (DL) subframe or DwPTS of a special subframe for an EPDCCH monitoring. Furthermore, in this case, a total of K ("K≥1") number of EPDCCH sets may be determined for the user equipment (i.e., user equipment configured to receive DCI through a corresponding EPDCCH) by higher-layer RRC signaling, along with configuration of the downlink or special subframe for the EPDCCH monitoring as described above. Herein, each EPDCCH set may include a group of PRBs (e.g., an N number of PRBs, where N={(1), 2, 4, 8} for a localized EPDCCH set, and N={2, 4, 8, (16)} for a distributed EPDCCH set). A maximum value of the 'K' may be determined as one of 2, 3, 4, and 6. The number ("N") of PRBs forming each EPDCCH set may be independently determined per EPDCCH set. Furthermore, a K number of EPDCCH sets (or set) may be classified into (i) a $K_L$ number of localized EPDCCH sets (or set) and (ii) a $K_D$ number of distributed EPDCCH sets (or set). Herein, $K_L$ and $K_D$ satisfy $K=K_L+K_D$. However, a total number of blind decodings of user equipment may be required not to be more than those of a typical (or legacy) system, regardless of values of N, K, $K_L$, and $K_D$ described above.

In a typical (or legacy) system, the number of CCEs to be monitored per aggregation level (AL) and the number of blind decodings according thereto are determined for DCI formats which are configured for a reception of a corresponding user equipment. In the case that a K number of EPDCCH sets (or set) are configured for user equipment, blind decoding attempts may be required to be distributed per EPDCCH set while maintaining a total number of blind decodings being the same as in the typical (or legacy) system. More specifically, in a typical (or legacy) system, for DCI formats configured for a reception of a corresponding user equipment, (i) the number of PDCCH candidates to be monitored per aggregation level (AL), (ii) the number of CCEs configuring a UE-specific search space (USS) per aggregation level (AL), and/or (iii) the number of blind decodings according to the above '(ii)' are determined according to configuration of PDSCH/PUSCH transmission mode(s) (TM) as described above. Herein, the above (i) may be considered for determination of the above (ii). Accordingly, in the case that a K number of EPDCCH sets (or set) are configured for user equipment, the number of EPDCCH candidates (i.e., the number of blind decodings to be performed in a corresponding EPDCCH set) may be required to be distributed per EPDCCH set while maintaining a total number of blind decodings being not more than those of the typical (or legacy) system.

In the case that user equipment is configured to receive downlink control information (DCI) through an EPDCCH corresponding to a newly-adopted downlink control channel, the present embodiment may define or provide schemes for performing a blind decoding per aggregation level (AL) in an EPDCCH monitoring set (or EPDCCH monitoring sets) for the user equipment.

In the case that user equipment is configured to receive DCI through an EPDCCH in a system associated with LTE-A release 11 and its follow-up release, the present embodiment may provide a blind decoding scheme for the user equipment. More specifically, the present embodiment may provide a scheme of implicitly dividing the number of EPDCCH candidates per aggregation level (AL), according to the number of EPDCCH sets assigned for a given user equipment and a size of each EPDCCH set (e.g., the number of PRBs forming a corresponding EPDCCH set).

As described above, in the case that a given user equipment is configured to receive DCI through an EPDCCH, a K ("K≥1") number of EPDCCH sets (or set) may be configured for the user equipment. In this case, each EPDCCH set may include a group of PRBs (e.g., an N number of PRBs). Furthermore, in case of each EPDCCH set, a type of a corresponding EPDCCH set may be determined as a distributed type or a localized type. In other words, a K number of EPDCCH sets (or set) configured for an EPDCCH user equipment may be configured with (i) a $K_L$ number of localized EPDCCH sets (or set) and (ii) a $K_D$ number of distributed EPDCCH sets (or set). Herein, the EPDCCH user equipment represents user equipment to which EPDCCH is applied. $K_L$ and $K_D$ satisfy $K=K_L+K_D$. In the case that an EPDCCH USS (i.e., a UE-specific search space of an EPDCCH) formed for a certain user equipment is configured with a K number of EPDCCH sets (or set), a blind decoding procedure for reception of downlink control information (DCI) may be performed in a legacy PDCCH CSS and the EPDCCH USS in an 'EPDCCH monitoring downlink (DL) subframe' configured by higher-layer signaling. In this case, a blind decoding UE operation (i.e., a blind decoding operation of the user equipment) in the legacy PDCCH CSS may be performed according to operations described in a typical LTE/LTE-A rel-10. A blind decoding UE operation in the EPDCCH USS may be required to be defined such that total blind decoding attempts are distributed to a K number of EPDCCH sets (or set) forming a corresponding EPDCCH USS while maintaining a total maximum number of blind decoding attempts. Herein, the total maximum number of blind decoding attempts may be "32" (in case of PUSCH TM 1) or "48" (in case of PUSCH TM 2) per component carrier (CC).

In addition, user equipment may be configured to monitor an EPDCCH. (i) For normal subframes and normal CP when the number of resources elements (REs) for a possible EPDCCH transmission is less than a threshold value ($X_{thresh}$) and (ii) for special subframes with special subframe configuration 3, 4, or 8 and normal CP when the number of resources elements (REs) for a possible EPDCCH transmission is less than a threshold value ($X_{thresh}$) (hereinafter cases (i) and (ii) may be referred to as "Case 1"), a localized EPDCCH set may be defined to support aggregation levels 2, 4, and 8. Otherwise (hereinafter referred to as "Case 2"), the localized EPDCCH set may be defined to support aggregation levels (ALs) 1, 2, and 4. Furthermore, in Case 1, the localized EPDCCH set may be defined to further support aggregation level (AL) 16. In Case 2, the localized EPDCCH set may be defined to further support aggregation level (AL) 8.

Likewise, (i) for normal subframes and normal CP when the number of resources elements (REs) for a possible EPDCCH transmission is less than a threshold value ($X_{thresh}$) and (ii) for special subframes with special subframe configuration 3, 4, or 8 and normal CP when the number of resources elements (REs) for a possible EPDCCH transmission is less than a threshold value ($X_{thresh}$) ("Case 1"), a distributed EPDCCH set may be defined to support aggregation levels 2, 4, 8, and 16. Otherwise ("Case 2"), the distributed EPDCCH set may be defined to support aggregation levels (ALs) 1, 2, 4, and 8. Furthermore, in Case 1, the distributed EPDCCH set may be defined to further support aggregation level (AL) 32. In Case 2, the distributed EPDCCH set may be defined to further support aggregation level (AL) 16. For example, the threshold value ($X_{thresh}$) used to determine aggregation levels (ALs) supported in a certain EPDCCH set may be "104". However, the present embodiment may be applied regardless of determination of a corresponding threshold value ($X_{thresh}$).

EPDCCH sets for a certain EPDCCH user equipment may be configured based on the above-described EPDCCH design criteria. Herein, the EPDCCH user equipment represents user equipment configured to receive DCI through an EPDCCH. In this case, the present embodiment may provide a method of determining the number of EPDCCH candidates per aggregation level (AL) in a corresponding EPDCCH set, and an apparatus therefor. Herein, the number of EPDCCH candidates per aggregation level (AL) represents the number of EPDCCH candidates to be monitored (i.e., to be blindly decoded) per aggregation level (AL) by a corresponding user equipment. More specifically, the present embodiment may provide a method and an apparatus for determining the number of EPDCCH candidates to be monitored per aggregation level (AL) in each EPDCCH set, based on (i) the number of EPDCCH sets formed for a corresponding user equipment, i.e., a K value (or $K_L$ and $K_D$ values), and (ii) the number of PRBs forming each EPDCCH set, i.e., an N value.

FIG. 1 illustrates a structure for configuration of EPDCCH sets for a certain user equipment in accordance with at least one embodiment. The EPDCCH set shown in FIG. 1 may be embodied by higher-layer signaling (e.g., RRC signaling).

Referring to FIG. 1, for descriptions of the present embodiment, it may be assumed that a structure of higher-layer signaling (e.g., RRC signaling) for configuration of EPDCCH sets for a certain user equipment is as shown in "110" of FIG. 1. In other words, in such structure, corresponding information region may be hierarchically configured with (i) configuration information (e.g., a K value) associated with the number ("K") of EPDCCH sets formed for a corresponding user equipment, and (ii) configuration information associated with each EPDCCH set (e.g., $1^{st}$ EPDCCH set configuration information, $2^{nd}$ EPDCCH set configuration information, ..., $K^{th}$ EPDCCH set configuration information). Herein, as shown in "120" of FIG. 1, each EPDCCH set configuration information may be configured with information elements (IEs) such as (i) assignment information on a group of PRBs forming a corresponding EPDCCH set (e.g., information on an $N_1$ number of PRBs forming the corresponding EPDCCH set), and (ii) information on a type of the corresponding EPDCCH set. In this case, the number of PRBs forming each EPDCCH set may be referred to as $N_1, N_2, \ldots, N_K$, and may be also referred to as "a size of each EPDCCH set."

Embodiment 1 corresponding to one of the present embodiments may distribute the number of EPDCCH candidates per aggregation level (AL), according to 'the number of EPDCCH sets' (e.g., "K").

The number of EPDCCH candidates per aggregation level (AL) to be monitored in each EPDCCH set by a corresponding user equipment may be determined according to a K value corresponding to the number of EPDCCH sets configured for a given user equipment. In other words, in the case that 'the total number of EPDCCH candidates per aggregation level (AL)' defined to be monitored by user equipment is referred to as $A_1, A_2, \ldots$, or $A_M$, the number of EPDCCH candidates per aggregation level (AL) to be monitored in each EPDCCH set may be determined according to Formula 1 below.

For EPDCCH set #n (configuration of $n^{th}$ EPDCCH set) [Formula 1]

(where $n = 1, 2, \ldots, K$)

Number of EPDCCH candidates at $1^{st} AL$: $\frac{1}{K} \times A_1$

Number of EPDCCH candidates at $2^{nd} AL$: $\frac{1}{K} \times A_2$ $\vdots$

Number of EPDCCH candidates at $M^{th} AL$: $\frac{1}{K} \times A_M$

In other schemes applying Formula 1 above, an information region indicating aggregation levels (ALs) supported in a corresponding EPDCCH set may be defined in each EPDCCH set configuration information. The number of EPDCCH candidates per aggregation level (AL) may be distributed based on the newly-defined information region associated with AL indication. In an example of defining such information region, AL indicator bits may be defined in each EPDCCH set configuration information, according to an M-bit bitmap scheme (i.e., a bitmap scheme using a bitmap configured with M bits). In this case, each bit in a corresponding bitmap field may be one-to-one mapped to each aggregation level (e.g., $1^{st}$ AL, . . . , or $M^{th}$ AL). Accordingly, such bitmap may inform a corresponding user equipment of whether each aggregation level (AL) is supported in a corresponding EPDCCH set. More specifically, in the case that one bitmap bit (i.e., one bit in a bitmap) is set to "1", an aggregation level (AL) corresponding to the bitmap bit may be supported in a corresponding EPDCCH set. Unlike this, in the case that a specific aggregation level (AL) is not supported in the corresponding EPDCCH set, a bitmap bit corresponding to the specific aggregation level (AL) may be set to "0". In the case that information on aggregation levels (ALs) supported in a given EPDCCH set is included in configuration information of the given EPDCCH set as described above, Formula 1 above may be modified per aggregation level (AL) as described in Formula 2 below.

For EPDCCH set #n (configuration of $n^{th}$ EPDCCH set) [Formula 2]

(where $n = 1, 2, \ldots, K$)

Number of EPDCCH candidates at $1^{st}$ AL:

$$\begin{cases} \frac{1}{K_1} \times A_1 & \text{in the case that a bitmap bit of } 1^{st} \\ & \text{AL indicator field is toggled} \\ 0 & \text{otherwise} \end{cases}$$

Number of EPDCCH candidates at $2^{nd}$ AL:

$$\begin{cases} \frac{1}{K_2} \times A_2 & \text{in the case that a bitmap bit of } 2^{nd} \\ & \text{AL indicator field is toggled} \\ 0 & \text{otherwise} \end{cases}$$

⋮

Number of EPDCCH candidates at $M^{th}$ AL:

$$\begin{cases} \frac{1}{K_M} \times A_M & \text{in the case that a bitmap bit of } M^{th} \\ & \text{AL indicator field is toggled} \\ 0 & \text{otherwise} \end{cases}$$

In Formula 2, $K_a$ represents the number of EPDCCH sets in which a corresponding bitmap bit of a $a^{th}$ AL indicator field is toggled.

An M number of aggregation levels (ALs) defined to support in an EPDCCH set formed for a corresponding user equipment may be arranged in ascending order from the lowest AL to the largest AL. In this case, $1^{st}$ AL, . . . , $M^{th}$ AL may represent the arranged aggregation levels (ALs). In other words, under the above-described EPDDCH design criteria, in the case that (i) a localized EPDCCH set supports aggregation levels (ALs) 1, 2, and 4 according to a threshold value ($X_{thresh}$), and (ii) a distributed EPDCCH set supports aggregation levels (ALs) 1, 2, 4, and 8, $1^{st}$ AL, $2^{nd}$ AL, $3^{rd}$ AL, and $4^{th}$ AL may correspond to AL 1, AL 2, AL 4, and AL 8, respectively. Alternatively, in the case that according to a threshold value ($X_{thresh}$), (i) a localized EPDCCH set supports aggregation levels (ALs) 2, 4, and 8, and (ii) a distributed EPDCCH set supports aggregation levels (ALs) 2, 4, 8, and 16, $1^{st}$ AL, $2^{nd}$ AL, $3^{rd}$ AL, and $4^{th}$ AL may correspond to AL 2, AL 4, AL 8, and AL 16, respectively.

However, the above-described two cases may correspond to a case that at least one distributed EPDCCH set is configured for a given user equipment. If all EPDCCH sets formed for a certain user equipment are of localized types, aggregation levels (ALs) supported in EPDCCH sets formed for the user equipment may be either "AL 1, AL 2, and AL 4" or "AL 2, AL 4, and AL 8." Accordingly, $1^{st}$ AL, $2^{nd}$ AL, and $3^{rd}$ AL may correspond to either "AL 1, AL 2, and AL 4" or "AL 2, AL 4, and AL 8," respectively. The total number of EPDCCH candidates per aggregation level (AL) may be determined as $A_1=6, A_2=6, A_3=2$, and $A_4=2$, respectively, regardless of satisfaction of a threshold value ($X_{thresh}$).

In other embodiments, the following three types (e.g., a-1, a-2, a-3) of values may be applied according to combination of types of EPDCCH sets formed for a given user equipment.

a-1) in the case that all EPDCCH sets formed for the given user equipment are of localized type, the total number of EPDCCH candidates per aggregation level (AL) may be determined as $A_1=6, A_2=6, A_3=4$, and $A_4=0$, respectively.

a-2) in the case that all EPDCCH sets formed for the given user equipment are of distributed type, the total number of EPDCCH candidates per aggregation level (AL) may be determined as $A_1=6, A_2=6, A_3=2$, and $A_4=2$, respectively.

a-3) in the case that EPDCCH sets formed for the given user equipment include at least one distributed EPDCCH set and at least one localized EPDCCH set, the total number of EPDCCH candidates per aggregation level (AL) may be determined as $A_1=6, A_2=6$, and $A_3=2$, respectively. Furthermore, in this case, $A_4=0$ may be applied for the localized EPDCCH set. For the distributed EPDCCH set, $A_4=2$ and $K_D$ (in place of K) may be applied to the above-described formula for the number of EPDCCH candidates at $4^{th}$ AL.

Figure 2:
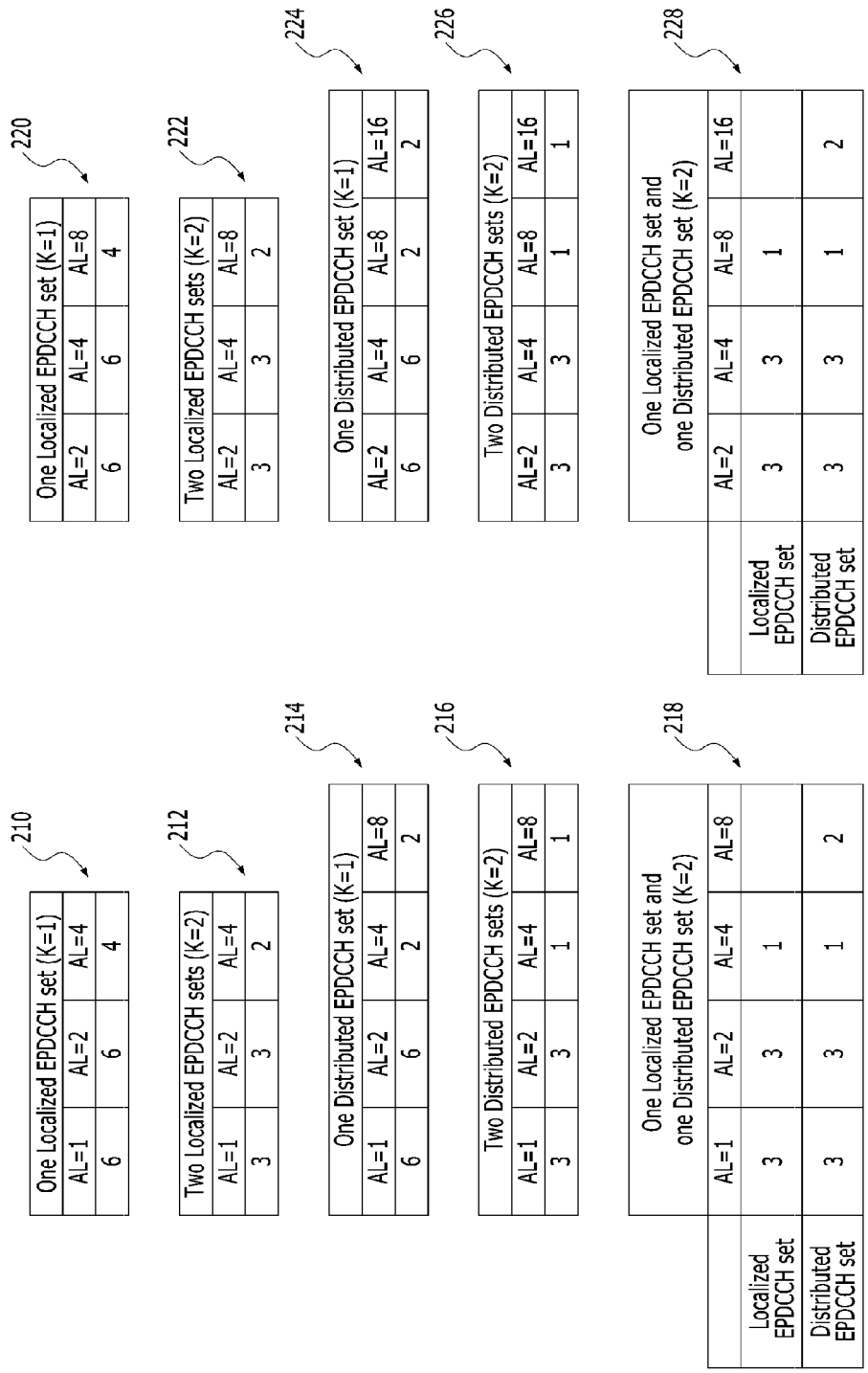
FIG. 2 illustrates the number of EPDCCH candidates in a case of combining Embodiment 1 and Formula 1 in accordance with at least one embodiment.

FIG. 2 illustrates the number of EPDCCH candidates in a case of combining Embodiment 1 and Formula 1 in accordance with at least one embodiment. In other words, FIG. 2 illustrates examples to which the cases "a-1," "a-2," and "a-3" are applied.

In FIG. 2, "210," "212," "214," "216," and "218" represent embodiments in which a localized EPDCCH set supports aggregation levels (ALs) 1, 2, and 4 according to a threshold value ($X_{thresh}$), and a distributed EPDCCH set supports aggregation levels (ALs) 1, 2, 4, and 8.

"220," "222," "224," "226," and "228" represent embodiments in which a localized EPDCCH set supports aggregation levels (ALs) 2, 4, and 8 according to a threshold value ($X_{thresh}$), and a distributed EPDCCH set supports aggregation levels (ALs) 2, 4, 8, and 16.

"210" and "220" represent the number of monitoring candidates in a localized EPDCCH set, in case of K=1. "212" and "222" represent the number of monitoring candidates in localized EPDCCH sets, in case of K=2. "214" and "224" represent the number of monitoring candidates in a distributed EPDCCH set, in case of K=1. "216" and "226" represent the number of monitoring candidates in distributed EPDCCH sets, in case of K=2. "218" and "228" represent the number of monitoring candidates in one localized EPDCCH set and one distributed EPDCCH set.

The above-described $A_1, A_2, A_3, A_4, (A_5)$ values may merely correspond to exemplary embodiments. A variety of combinations satisfying "$A_1+A_2+A_3+A_4=16$" or "$A_1+A_2+A_3+A_4+A_5=16$" may be included in a scope of the present invention.

Embodiment 2 corresponding to one of the present embodiments may distribute the number of EPDCCH candidates per aggregation level (AL), according to a size of an EPDCCH set.

In Embodiment 2, a size of an EPDCCH set may be the number of PRBs. Accordingly, Embodiment 2 may include a distribution scheme based on the number of PRBs.

In the case that an EPDCCH set is configured for a certain user equipment, the number of EPDCCH candidates (or the number of blind decodings according thereto) to be monitored per aggregation level (AL) (i.e., per each of the aggregation levels (ALs) supported in a corresponding EPDCCH set according to an EPDCCH set type) by a corresponding user equipment may be defined. More specifically, the number of EPDCCH candidates may be defined such that 'the total number of EPDCCH candidates per aggregation level (AL)' defined to be monitored by a corresponding user equipment can be distributed to each EPDCCH set, in proportion to 'a size of each EPDCCH set' (e.g., $N_1, \ldots, N_K$ described above) regardless of types of EPDCCH sets. In other words, a K number of EPDCCH sets may be allocated for a certain EPDCCH user equipment (i.e., user equipment configured to receive DCI through an EPDCCH). Herein, each of the K number of EPDCCH sets may have a size of $N_1, N_2, \ldots,$ or $N_K$. Furthermore, 'the total number of EPDCCH candidates per aggregation level (AL)' defined to be monitored by the user equipment may be referred to as $A_1, A_2, \ldots,$ or $A_M$. Accordingly, in this case, 'the number of EPDCCH candidates per aggregation level (AL)' to be monitored in each EPDCCH set may be defined according to Formula 3 below.

For $EPDCCH$ set #$n$ (configuration of $n^{th}$ $EPDCCH$ set) [Formula 3]

(where $n = 1, 2, \ldots, K$)

Number of $EPDCCH$ candidates at $1^{st} AL$: $\frac{N_1}{N_{total}} \times A_1$ Number of $EPDCCH$ candidates at $2^{nd} AL$: $\frac{N_2}{N_{total}} \times A_2$ $\vdots$ Number of $EPDCCH$ candidates at $M^{th} AL$: $\frac{N_M}{N_{total}} \times A_M$ where $N_{total} = \sum_{i=1}^{K} N_i$ In other schemes applying Formula 3 above, as described in Embodiment 1, an information region indicating an aggregation level (AL) supported in a corresponding EPDCCH set may be defined in each EPDCCH set configuration information. The number of EPDCCH candidates per aggregation level (AL) may be distributed based on the newly-defined information region associated with AL indication. In an example of defining such information region, AL indicator bits may be defined in each EPDCCH set configuration information, according to an M-bit bitmap scheme (i.e., a bitmap scheme using a bitmap configured with M bits). In this case, each bit in corresponding bitmap field may be one-to-one mapped to an aggregation level (e.g., $1^{st}$ AL, $\ldots$, $M^{th}$ AL). Accordingly, such bitmap may inform a corresponding user equipment of whether each aggregation level (AL) is supported in a corresponding EPDCCH set. More specifically, in the case that one bitmap bit (i.e., one bit in a bitmap) is set to "1", an aggregation level (AL) corresponding to the bitmap bit may be supported in a corresponding EPDCCH set. Unlike this, in the case that a specific aggregation level (AL) is not supported in the corresponding EPDCCH set, a bitmap bit corresponding to the specific aggregation level (AL) may be set to "0". In the case that information on aggregation levels (ALs) supported in a given EPDCCH set is included in configuration information of the given EPDCCH set as described above, Formula 3 above may be modified per aggregation level (AL) as described in Formula 4 below.

For $EPDCCH$ set #$n$ (configuration of $n^{th}$ $EPDCCH$ set) [Formula 4]

(where $n = 1, 2, \ldots, K$)

Number of $EPDCCH$ candidates at $1^{st} AL$:

$\begin{cases} \frac{N_1}{N_{total,1}} \times A_1 & \text{in the case that a bitmap bit of } 1^{st} \\ & \text{AL indicator field is toggled} \\ 0 & \text{otherwise} \end{cases}$ Number of $EPDCCH$ candidates at $2^{nd} AL$:

$\begin{cases} \frac{N_2}{N_{total,2}} \times A_2 & \text{in the case that a bitmap bit of } 2^{nd} \\ & \text{AL indicator field is toggled} \\ 0 & \text{otherwise} \end{cases}$ $\vdots$ Number of $EPDCCH$ candidates at $M^{th} AL$:

$\begin{cases} \frac{N_M}{N_{total,M}} \times A_M & \text{in the case that a bitmap bit of } M^{th} \\ & \text{AL indicator field is toggled} \\ 0 & \text{otherwise} \end{cases}$ where $N_{total,m} = \sum_{i=1}^{K} N_i \times b_{i,m}$ In Formula 4, $b_{i,m}$ may represent a bitmap bit value of an indicator field corresponding to $m^{th}$ aggregation level (AL) in $i^{th}$ EPDCCH set.

An M number of aggregation levels (ALs) defined to support in an EPDCCH set formed for a corresponding user equipment may be arranged in ascending order from the lowest AL to the largest AL. In this case, $1^{st}$ AL, $\ldots$, $M^{th}$ AL may represent the arranged aggregation levels (ALs). In other words, under the above-described EPDDCH design criteria, in the case that (i) a localized EPDCCH set supports aggregation levels (ALs) 1, 2, and 4 according to a threshold value ($X_{thresh}$), and (ii) a distributed EPDCCH set supports aggregation levels (ALs) 1, 2, 4, and 8, $1^{st}$ AL $2^{nd}$ AL, $3^{rd}$ AL, and $4^{th}$ AL may correspond to AL 1, AL 2, AL 4, and AL 8, respectively. Alternatively, in the case that according to a threshold value ($X_{thresh}$), (i) a localized EPDCCH set supports aggregation levels (ALs) 2, 4, and 8, and (ii) a distributed EPDCCH set supports aggregation levels (ALs) 2, 4, 8, and 16, $1^{st}$ AL, $2^{nd}$ AL, $3^{rd}$ AL, and $4^{th}$ AL may correspond to AL 2, AL 4, AL 8, and AL 16, respectively. Accordingly, the total number of EPDCCH candidates per aggregation level (AL) may be determined as $A_1=6, A_2=6, A_3=2,$ and $A_4=2$, respectively, regardless of satisfaction of a threshold value ($X_{thresh}$).

In other embodiments, the following three types (e.g., b-1, b-2, b-3) of values may be applied according to combination of types of EPDCCH sets formed for a given user equipment.

b-1) in the case that all EPDCCH sets formed for the given user equipment are of localized type, the total number of EPDCCH candidates per aggregation level (AL) may be determined as $A_1=6, A_2=6, A_3=4,$ and $A_4=0$, respectively.

b-2) in the case that all EPDCCH sets formed for the given user equipment are of distributed type, the total number of EPDCCH candidates per aggregation level (AL) may be determined as $A_1=6$, $A_2=6$, $A_3=2$, and $A_4=2$, respectively.

b-3) in the case that EPDCCH sets formed for the given user equipment include at least one distributed EPDCCH set and at least one localized EPDCCH set, the total number of EPDCCH candidates per aggregation level (AL) may be determined as $A_1=6$, $A_2=6$, and $A_3=2$, respectively. Furthermore, in this case, $A_4=0$ may be applied for the localized EPDCCH set. For the distributed EPDCCH set, $A_4=2$ and $K_D$ (in place of K) may be applied to the above-described formula for the number of EPDCCH candidates at $4^{th}$ AL.

In other embodiments, under the above-described EPDCCH design criteria, in the case that (i) a localized EPDCCH set supports aggregation levels (ALs) 1, 2, 4, and 8 according to a threshold value $(X_{thresh})$, and (ii) a distributed EPDCCH set supports aggregation levels (ALs) 1, 2, 4, 8, and 16, $1^{st}$ AL, $2^{nd}$ AL, $3^{rd}$ AL, $4^{th}$ AL, and $5^{th}$ AL may correspond to AL 1, AL 2, AL 4, AL 8, and AL 16, respectively. Alternatively, in the case that according to a threshold value $(X_{thresh})$, (i) a localized EPDCCH set supports aggregation levels (ALs) 2, 4, 8, and 16 and (ii) a distributed EPDCCH set supports aggregation levels (ALs) 2, 4, 8, 16, and 32, $1^{st}$ AL, $2^{nd}$ AL, $3^{rd}$ AL, $4^{th}$ AL, and $5^{th}$ AL may correspond to AL 2, AL 4, AL 8, AL 16, and AL 32, respectively. Accordingly, the total number of EPDCCH candidates per aggregation level (AL) may be determined as $A_1=6$, $A_2=6$, $A_3=2$, $A_4=1$, and $A_5=1$, respectively, regardless of satisfaction of a threshold value $(X_{thresh})$.

In other embodiments, the following three types (e.g., c-1, c-2, c-3) of values may be applied according to combination of types of EPDCCH sets formed for a given user equipment.

c-1) in the case that all EPDCCH sets formed for the given user equipment are of localized type, the total number of EPDCCH candidates per aggregation level (AL) may be determined as $A_1=6$, $A_2=6$, $A_3=2$, and $A_4=2$, respectively.

c-2) in the case that all EPDCCH sets formed for the given user equipment are of distributed type, the total number of EPDCCH candidates per aggregation level (AL) may be determined as $A_1=6$, $A_2=6$, $A_3=2$, $A_4=1$, and $A_5=1$, respectively.

c-3) in the case that EPDCCH sets formed for the given user equipment include at least one distributed EPDCCH set and at least one localized EPDCCH set, the total number of EPDCCH candidates per aggregation level (AL) may be determined as $A_1=6$, $A_2=6$, and $A_3=2$, respectively. Furthermore, in this case, $A_4=1$ and $A_5=0$ may be applied for the localized EPDCCH set, $A_4=0$ and $A_5=1$ may be applied for the distributed EPDCCH set.

FIG. 3 illustrates the number of EPDCCH candidates in a case of combining Embodiment 2 and Formula 3 in accordance with at least one embodiment. In Embodiment 2, the number of EPDCCH candidates may be determined in proportion to a size (e.g., a physical set size) of each EPDCCH set. Hereinafter, embodiments associated with two or more EPDCCH sets will be described. Furthermore, described will be embodiments which support aggregation levels (ALs) 1, 2, 4, and 8 according to a threshold value $(X_{thresh})$ in a localized EPDCCH set, and support aggregation levels (ALs) 1, 2, 4, 8, and 16 in a distributed EPDCCH set.

In FIG. 3, "310" illustrates the number of EPDCCH candidates in the case that localized EPDCCH sets have the same size. The above-described "c-1" may be applied since two EPCCH sets have the same number of PRBs. Accordingly, for each EPDCCH set (e.g., each of the first and second EPDCCH set), the number of EPDCCH candidates at AL=1 (corresponding to $1^{st}$ AL) may be "3". Similarly, for each EPDCCH set, the number of EPDCCH candidates at AL=2 (corresponding to $2^{nd}$ AL), AL=4 (corresponding to $3^{rd}$ AL), or AL=8 (corresponding to $4^{th}$ AL) may be "3", "1", or "1", respectively.

Meanwhile, "312" illustrates the number of EPDCCH candidates in the case that localized EPDCCH sets have a different size. As described in "c-1", $A_1=6$, $A_2=6$, $A_3=2$, and $A_4=2$ may be applied to "312". In the case that Formula 3 is applied, if the number of PRBs of a first localized EPDCCH set is "4" and the number of PRBs of a second localized EPDCCH set is "2", (i) $N_{total}$ may be "6", $$(ii)\ \frac{N_1}{N_{total}}$$

corresponding to a multiplying factor associated with the first localized EPDDCH set may be ⅔, and $$(iii)\ \frac{N_2}{N_{total}}$$

corresponding to a multiplying factor associated with the second localized EPDDCH set may be ⅓. In cases of AL=4 and AL=8, the number of EPDCCH candidates may be determined as "1", respectively since multiplication results of the multiplying factors are not an integer.

Likewise, in case of distributed EPDCCH sets, the number of EPDCCH candidates may be determined as shown in "320" and "322". "320" illustrates a case that distributed EPDCCH sets have the same size. "322" illustrates a case that the number of PRBs of a first distributed EPDCCH set is "4" and the number of PRBs of a distributed EPDCCH set is "2". "320" and "322" illustrate embodiments to which $A_1=6$, $A_2=6$, $A_3=2$, $A_4=1$, and $A_5=1$ determined in "c-2" are applied.

In "320," in cases of AL=8 and AL=16 for the first distributed EPDCCH set and the second distributed EPDCCH set, it may be that $A_4=1$ and $A_5=1$. Accordingly, two distributed EPDCCH sets may be embodied such that the number of EPDCCH candidates is selectively determined as "1" as shown in "320".

In the case that Formula 3 is applied, if the number of PRBs of a first distributed EPDCCH set is "4" and the number of PRBs of a second distributed EPDCCH set is "2", (i) $N_{total}$ may be "6", $$(ii)\ \frac{N_1}{N_{total}}$$

corresponding to a multiplying factor associated with the first distributed EPDDCH set may be ⅔, and $$(iii)\ \frac{N_2}{N_{total}}$$

corresponding to a multiplying factor associated with the second distributed EPDDCH set may be ⅓. In cases of AL=4 and AL=8, the number of EPDCCH candidates may be determined as "1", respectively since multiplication results of the multiplying factors are not an integer. Furthermore, in cases of AL=4, AL=8, and AL=16, the number of EPDCCH candidates may be selectively determined as "1" as shown in "322", since $A_3$=2, $A_4$=1, and $A_5$=1.

"330" and "332" illustrate the number of EPDCCH candidates in the case that one localized EPDCCH set and one distributed EPDCCH set are included. In this case, if "c-3" is applied, "330" illustrates a case that two EPDCCH sets have the same size. In "330", $A_1$=6, $A_2$=6, $A_3$=2, $A_4$=1, and $A_5$=0 may be applied for the localized EPDCCH set, and $A_1$=6, $A_2$=6, $A_3$=2, $A_4$=0, and $A_5$=1 may be applied for the distributed EPDCCH set. Meanwhile, "332" illustrates a case that two EPDCCH sets have a different size. In the case that Formula 3 is applied, if the number of PRBs of a first EPDCCH set (e.g., a localized EPDCCH set) is "4" and the number of PRBs of a second EPDCCH set (e.g., a distributed EPDCCH set) is "2", (i) $N_{total}$ may be "6", (ii) $\frac{N_1}{N_{total}}$ corresponding to a multiplying factor associated with the first EPDCCH set (e.g., a localized EPDCCH set) may be ⅔, and (iii) $\frac{N_2}{N_{total}}$ corresponding to a multiplying factor associated with the second EPDCCH set (e.g., a distributed EPDCCH set) may be ⅓. In this case, "c-3" and Formula 3 may be applied. Particularly, as a result of applying "c-3" and Formula 3, the number of EPDCCH candidates having a non-integer value may be determined as a value calculated by an integer function (i.e., a function of converting a certain non-integer value to an integer value).

The above-described $A_1$, $A_2$, $A_3$, $A_4$, ($A_5$) values may merely correspond to exemplary embodiments. A variety of combinations satisfying "$A_1+A_2+A_3+A_4$=16" or "$A_1+A_2+A_3+A_4+A_5$=16" may be included in a scope of the present invention.

It may be obvious that other embodiments of applying different schemes per aggregation level (AL) may be included in a scope of the present invention. Furthermore, a scheme of obtaining the number of EPDCCH candidates may be defined to exclude or restrict a case that the number of EPDCCH candidates per aggregation level (AL) calculated in an EPDCCH set according to the above-described schemes has a non-integer value. Alternatively, in the case that the number of EPDCCH candidates per aggregation level (AL) calculated in an EPDCCH set has a non-integer value, an integer function (e.g., a 'ceil' function, a 'floor' function, etc.) may be applied to obtain an integer value which is greater or less than a corresponding non-integer value.

Hereinafter, a DCI transmission procedure of a base station and a DCI reception procedure of user equipment will be described in more detail. Herein, the user equipment may be an EPDCCH user equipment configured to receive DCI through an EPDCCH. Furthermore, in the case that user equipment is configured to receive DCI through an EPDCCH newly-defined in a system associated with 3GPP LTE/LTE-A release 11 and its follow-up release, the present embodiment relates to a method of performing a blind decoding in the user equipment, and an apparatus therefor.

FIG. 4 illustrates a procedure of creating an EPDCCH based on determination of the number of blind decodings and transmitting the created EPDCCH, in a base station in accordance with at least one embodiment.

At step S410, the base station may calculate the number of blind decoding candidates (e.g., the number of EPDCCH candidates) according to (i) a resource size of each EPDCCH set (i.e., a resource size associated with configuration of each EPDCCH set) and/or (ii) the total number of EPDCCH sets. In this case, Formula 3 and Formula 4 associated with a resource size of each EPDCCH set may be applied. Alternatively, Formula 1 and Formula 2 associated with the total number of EPDCCH sets may be applied. In other embodiments, such calculation operation for the number of blind decoding candidates may be performed in advance, and a base station and user equipment may share the same information (e.g., the number of blind decoding candidates). Accordingly, such calculation operation (e.g., S410) may be selectively performed. At step S420, the base station may create an EPDCCH by using the number of blind decoding candidates (e.g., the number of EPDCCH candidates) per aggregation level (AL) in each of one or more EPDCCH sets for the user equipment. Thereafter, at step S430, the base station may transmit the created EPDCCH to the user equipment.

As described at step S410, the number of blind decoding candidates (e.g., the number of EPDCCH candidates) may be in proportion to (i) a resource size of each EPDDCH set (i.e., a resource size associated with configuration of each EPDCCH set) and/or (ii) a reciprocal of the total number of EPDCCH sets. Herein, the resource size may be the number of physical resource blocks (PRBs) forming each EPDCCH set. In case of two or more EPDCCH sets, if Formula 3 is applied, the number of blind decoding candidates (e.g., the number of EPDCCH candidates) per aggregation level (AL) in each EPDCCH set may be determined according to a ratio created by dividing the number of PRBs forming one EPDCCH set by the number of PRBs forming total EPDCCH sets. Furthermore, in this case, if the ratio is not an integer, the number of blind decoding candidates (e.g., the number of EPDCCH candidates) may be determined by applying an integer function (i.e., a function of converting a certain non-integer value to an integer value) or a predetermined integer.

Meanwhile, the base station may inform the user equipment of the number of blind decoding candidates (e.g., the number of EPDCCH candidates) determined at step S410. More specifically, the base station may transmit information indicating the number of blind decoding candidates (e.g., the number of EPDCCH candidates) per aggregation level (AL) in each EPDCCH set, to the user equipment.

Figure 5:
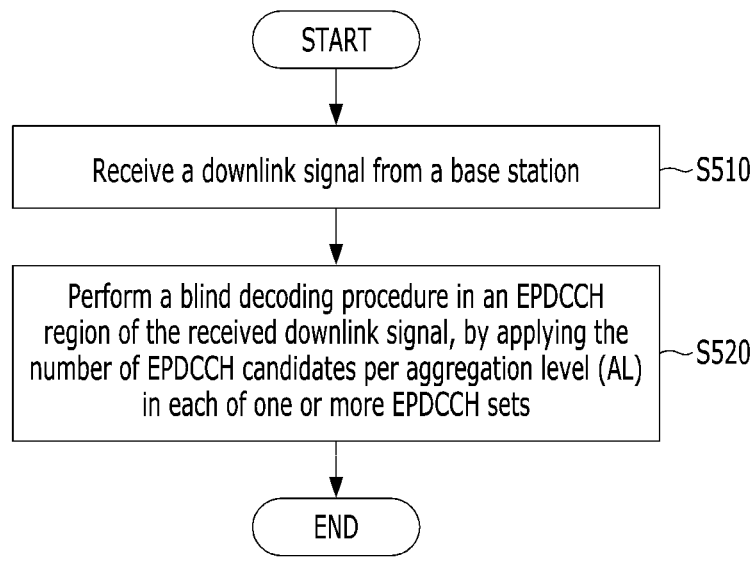
FIG. 5 illustrates a procedure of adjusting a blind decoding procedure in an EPDCCH region using the number of blind decodings, in user equipment in accordance with at least one embodiment.

FIG. 5 illustrates a procedure of adjusting a blind decoding procedure in an EPDCCH region using the number of blind decodings, in user equipment in accordance with at least one embodiment.

At step S510, the user equipment may receive a downlink signal from a base station. At step S520, the user equipment may perform a blind decoding in an EPDCCH region of the received downlink signal, by applying the number of blind decoding candidates (e.g., the number of EPDCCH candidates) per aggregation level (AL) in each of one or more EPDCCH sets. Herein, the number of blind decoding candidates (e.g., the number of EPDCCH candidates) may be in proportion to (i) a resource size of each EPDDCH set (i.e., a resource size associated with configuration of each EPD- CCH set) and/or (ii) a reciprocal of the total number of EPDCCH sets. Herein, the number of blind decoding candidates (e.g., the number of EPDCCH candidates) may be calculated according to (i) Formula 3 and Formula 4 associated with a resource size of each EPDCCH set, or (ii) Formula 1 and Formula 2 associated with the total number of EPDCCH sets. In other embodiments, such calculation operation for the number of blind decoding candidates may be performed in advance, and a base station and user equipment may share the same information (e.g., the number of blind decoding candidates).

As described above, the number of blind decoding candidates (e.g., the number of EPDCCH candidates) may be in proportion to (i) a resource size of each EPDDCH set (i.e., a resource size associated with configuration of each EPDCCH set) and/or (ii) a reciprocal of the total number of EPDCCH sets. Herein, the resource size may be the number of physical resource blocks (PRBs) forming each EPDCCH set. In case of two or more EPDCCH sets, if Formula 3 is applied, the number of blind decoding candidates (e.g., the number of EPDCCH candidates) per aggregation level (AL) in each EPDCCH set may be determined according to a ratio created by dividing the number of PRBs forming one EPDCCH set by the number of PRBs forming total EPDCCH sets. Furthermore, in this case, if the ratio is not an integer, the number of blind decoding candidates (e.g., the number of EPDCCH candidates) may be determined by applying an integer function (i.e., a function of converting a certain non-integer value to an integer value) or a predetermined integer.

Meanwhile, in order to share the number of blind decoding candidates between a base station and user equipment, the user equipment may receive information indicating the number of blind decoding candidates (e.g., the number of EPDCCH candidates) per aggregation level (AL) in each EPDCCH set, from the base station.

In FIG. 4 and FIG. 5, a base station and user equipment may have the number of blind decoding candidates (e.g., the number of EPDCCH candidates) in form of table, in advance. Alternatively, a base station may inform user equipment of the number of blind decoding candidates (e.g., the number of EPDCCH candidates), through indication information. In other embodiments, user equipment may calculate the number of blind decoding candidates (e.g., the number of EPDCCH candidates) per aggregation level (AL) in each EPDCCH set, according to the same scheme as in a base station. A scheme in which a base station and user equipment share information on the number of blind decoding candidates (e.g., the number of EPDCCH candidates) may be variously embodied, and the present embodiments are not limited to a specific sharing scheme.

Figure 6:
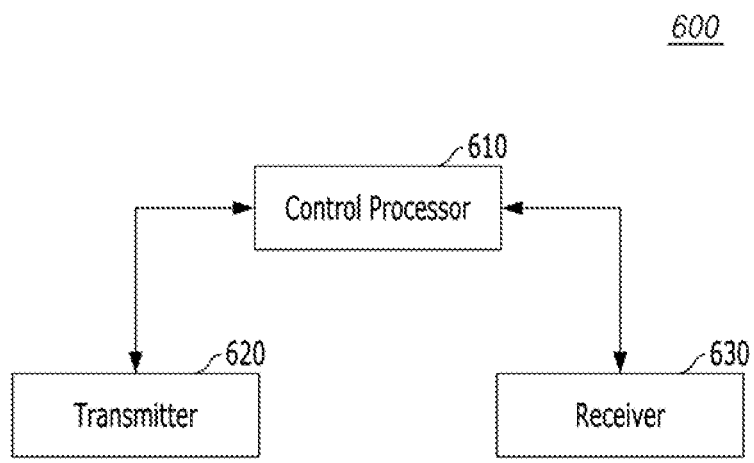
FIG. 6 is a diagram illustrating a structure of a base station in accordance with some embodiments.

FIG. 6 is a diagram illustrating a structure of a base station in accordance with some embodiments.

Referring to FIG. 6, base station 600 according to at least one embodiment may include control processor 610, transmitter 620, and receiver 630.

Control processor 610 may control operations (i.e., operations of base station 600) which are required for performing the above-described present embodiments. More specifically, control processor 610 may control operations (i.e., operations of base station 600) associated with a downlink control information (DCI) reception of user equipment. Herein, the user equipment is configured to receive downlink control information (DCI) through an EPDCCH.

Transmitter 620 and receiver 630 may respectively transmit and receive signals, messages, and/or data required for performing the above-described present embodiments, in connection with the user equipment. Base station 600 shown in FIG. 6 may perform a base station operation described in FIG. 4.

More specifically, control processor 610 may create an EPDCCH using the number of blind decoding candidates (e.g., the number of EPDCCH candidates) per aggregation level (AL) in each of one or more EPDCCH sets for the user equipment. Transmitter 620 may transmit the created EPDCCH to the user equipment. As described above, the number of blind decoding candidates (e.g., the number of EPDCCH candidates) may be in proportion to (i) a resource size of each EPDDCH set (i.e., a resource size associated with configuration of each EPDCCH set) and/or (ii) a reciprocal of the total number of EPDCCH sets.

The number of blind decoding candidates (e.g., the number of EPDCCH candidates) may be in proportion to (i) a resource size of each EPDDCH set (i.e., a resource size associated with configuration of each EPDCCH set) and/or (ii) a reciprocal of the total number of EPDCCH sets. Herein, the resource size may be the number of physical resource blocks (PRBs) forming each EPDCCH set. In case of two or more EPDCCH sets, if Formula 3 is applied, the number of blind decoding candidates (e.g., the number of EPDCCH candidates) per aggregation level (AL) in each EPDCCH set may be determined according to a ratio created by dividing the number of PRBs forming one EPDCCH set by the number of PRBs forming total EPDCCH sets. Furthermore, in this case, if the ratio is not an integer, the number of blind decoding candidates (e.g., the number of EPDCCH candidates) may be determined by applying an integer function (i.e., a function of converting a certain non-integer value to an integer value) or a predetermined integer. Furthermore, transmitter 620 may transmit information indicating the number of blind decoding candidates (e.g., the number of EPDCCH candidates) per aggregation level (AL) in each EPDCCH set, to the user equipment.

Figure 7:
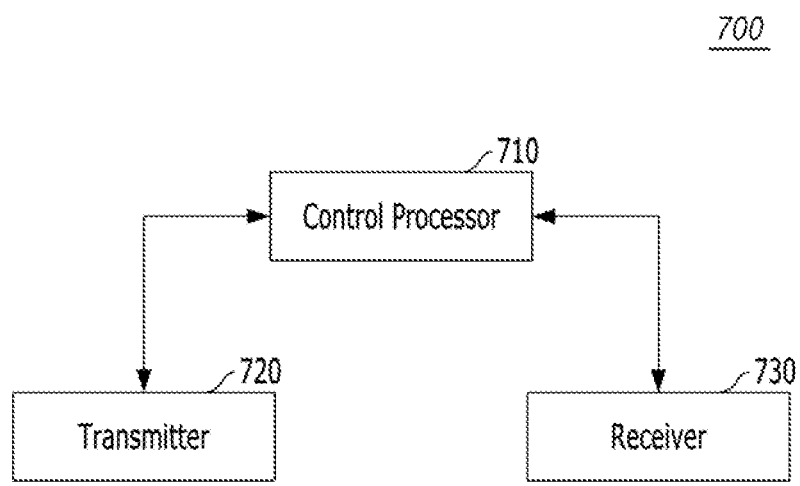
FIG. 7 is a diagram illustrating a structure of user equipment in accordance with some embodiments.

FIG. 7 is a diagram illustrating a structure of user equipment in accordance with some embodiments.

Referring to FIG. 7, user equipment 700 according to at least one embodiment may include control processor 710, transmitter 720, and receiver 730.

Receiver 730 may receive downlink control information, data, and/or messages through a corresponding channel from a base station (e.g., base station 600).

Control processor 710 may control operations (i.e., operations of use equipment 700) which are required for performing the above-described present embodiments. More specifically, control processor 710 may control operations (i.e., operations of user equipment 700) associated with a downlink control information (DCI) reception of user equipment 700. Herein, user equipment 700 is configured to receive downlink control information (DCI) through an EPDCCH.

Transmitter 720 may transmit control information, data, and/or messages through a corresponding channel, to the base station. User equipment 700 shown in FIG. 7 may perform a user equipment operation described in FIG. 5.

Receiver 730 may receive a downlink signal from a base station. Control processor 710 may perform a blind decoding in an EPDCCH region of the received downlink signal, by applying the number of blind decoding candidates (e.g., the number of EPDCCH candidates) per aggregation level (AL) in each of one or more EPDCCH sets. Herein, the number of blind decoding candidates (e.g., the number of EPDCCH candidates) may be in proportion to (i) a resource size of each EPDDCH set (i.e., a resource size associated with configuration of each EPDCCH set) and/or (ii) a reciprocal of the total number of EPDCCH sets.

As described above, the number of blind decoding candidates (e.g., the number of EPDCCH candidates) may be in proportion to (i) a resource size of each EPDDCH set (i.e., a resource size associated with configuration of each EPDCCH set) and/or (ii) a reciprocal of the total number of EPDCCH sets. Herein, the resource size may be the number of physical resource blocks (PRBs) forming each EPDCCH set. In case of two or more EPDCCH sets, if Formula 3 is applied, the number of blind decoding candidates (e.g., the number of EPDCCH candidates) per aggregation level (AL) in each EPDCCH set may be determined according to a ratio created by dividing the number of PRBs forming one EPDCCH set by the number of PRBs forming total EPDCCH sets. Furthermore, in this case, if the ratio is not an integer, the number of blind decoding candidates (e.g., the number of EPDCCH candidates) may be determined by applying an integer function (i.e., a function of converting a certain non-integer value to an integer value) or a predetermined integer. Receiver 730 may receive information indicating the number of blind decoding candidates (e.g., the number of EPDCCH candidates) per aggregation level (AL) in each EPDCCH set, from the base station.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of adjusting a blind decoding of a downlink control channel in a base station, the method comprising:
    creating an enhanced physical downlink control channel (EPDCCH) using the number of EPDCCH candidates per aggregation level (AL) in each of one or more EPDCCH sets for user equipment; and
    transmitting the created EPDCCH to the user equipment,
    wherein in a case of two EPDCCH sets, when the number of physical resource blocks (PRBs) forming one EPDCCH set is equal to the number of physical resource blocks (PRBs) forming total EPDCCH sets,
    the number of EPDCCH candidates per aggregation level (AL) in each EPDCCH set is determined same number.

2. The method of claim 1, wherein the number of EPDCCH candidates associated with a part or all of corresponding aggregation levels (ALs) in the one EPDCCH set or in a part or all of the EPDCCH sets is in proportion to at least one of (i) a resource size associated with configuration of each EPDCCH set and (ii) a reciprocal of the total number of EPDCCH sets.

3. The method of claim 2, wherein the resource size is the number of physical resource blocks (PRBs) forming each EPDCCH set.

4. A method of adjusting a blind decoding of a downlink control channel in user equipment, the method comprising:
    receiving a downlink signal from a base station; and
    performing a blind decoding procedure in an EPDCCH region of the received downlink signal, by applying the number of EPDCCH candidates per aggregation level (AL) in each of one or more EPDCCH sets,
    wherein in a case of two EPDCCH sets, when the number of physical resource blocks (PRBs) forming one EPDCCH set is equal to the number of physical resource blocks (PRBs) forming total EPDCCH sets,
    the number of EPDCCH candidates per aggregation level (AL) in each EPDCCH set is determined same number.

5. The method of claim 4, wherein the number of EPDCCH candidates associated with a part or all of corresponding aggregation levels (ALs) in the one EPDCCH set or in a part or all of the EPDCCH sets is in proportion to at least one of (i) a resource size associated with configuration of each EPDCCH set and (ii) a reciprocal of the total number of EPDCCH sets.

6. The method of claim 5, wherein the resource size is the number of physical resource blocks (PRBs) forming each EPDCCH set.

7. User equipment for adjusting a blind decoding of a downlink control channel, the user equipment comprising:
    a receiver configured to receive a downlink signal from a base station; and
    a control processor configured to perform a blind decoding in an EPDCCH region of the received downlink signal, by applying the number of EPDCCH candidates per aggregation level (AL) in each of one or more EPDCCH sets,
    wherein in a case of two EPDCCH sets, when the number of physical resource blocks (PRBs) forming one EPDCCH set is equal to the number of physical resource blocks (PRBs) forming total EPDCCH sets,
    the number of EPDCCH candidates per aggregation level (AL) in each EPDCCH set is determined same number.

8. The user equipment of claim 7, wherein the number of EPDCCH candidates associated with a part or all of corresponding aggregation levels (ALs) in the one EPDCCH set or in a part or all of the EPDCCH sets is in proportion to at least one of (i) a resource size associated with configuration of each EPDCCH set and (ii) a reciprocal of the total number of EPDCCH sets.

9. The user equipment of claim 8, wherein the resource size is the number of physical resource blocks (PRBs) forming each EPDCCH set.

* * * * *